Feb. 25, 1936.   R. HOLT   2,032,210
INSTANTANEOUS ELECTRICAL WATER HEATER
Filed May 6, 1935   2 Sheets-Sheet 1

Richard Holt
Inventor

By Haseltine, Lake & Co.
Attorneys

Feb. 25, 1936.     R. HOLT     2,032,210
INSTANTANEOUS ELECTRICAL WATER HEATER
Filed May 6, 1935     2 Sheets-Sheet 2

Richard Holt
Inventor

By Haseltine, Lake & Co.
Attorneys

Patented Feb. 25, 1936

2,032,210

UNITED STATES PATENT OFFICE 2,032,210

INSTANTANEOUS ELECTRICAL WATER HEATER

Richard Holt, Henley Beach, South Australia, Australia

Application May 6, 1935, Serial No. 20,021
In Australia May 7, 1934

9 Claims. (Cl. 219—40)

My invention relates to an electrical water heater, its object being to so construct such heater that water can be heated quickly, and the opening and closing of the electrical circuit is controlled by the water supply and without conventional switches.

The present invention comprises essentially a metal cylinder which encloses but does not touch a metal rod, the said cylinder and rod being supported by an insulating platform, and the insulating platform being supported by the sides of a container. Also fitted to this container are two water pipe sockets, one acting as the inlet to the cylinder and the other acting as the outlet from the cylinder, communication being made between these sockets and the cylinder by means of rubber tubes.

According to a modification the rubber tubes are allowed to drain, while according to a further modification a plurality of rods is provided.

In order that my invention may be the more clearly understood, however, I will now describe it with reference to the accompanying drawings in which.

Figure 2:
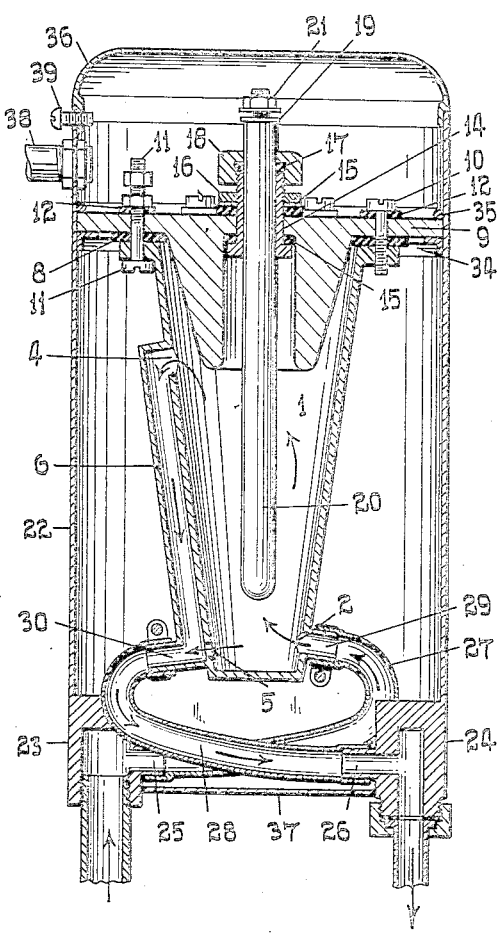
Fig. 2 is a diagrammatic central sectional view of same.
Figure 5:
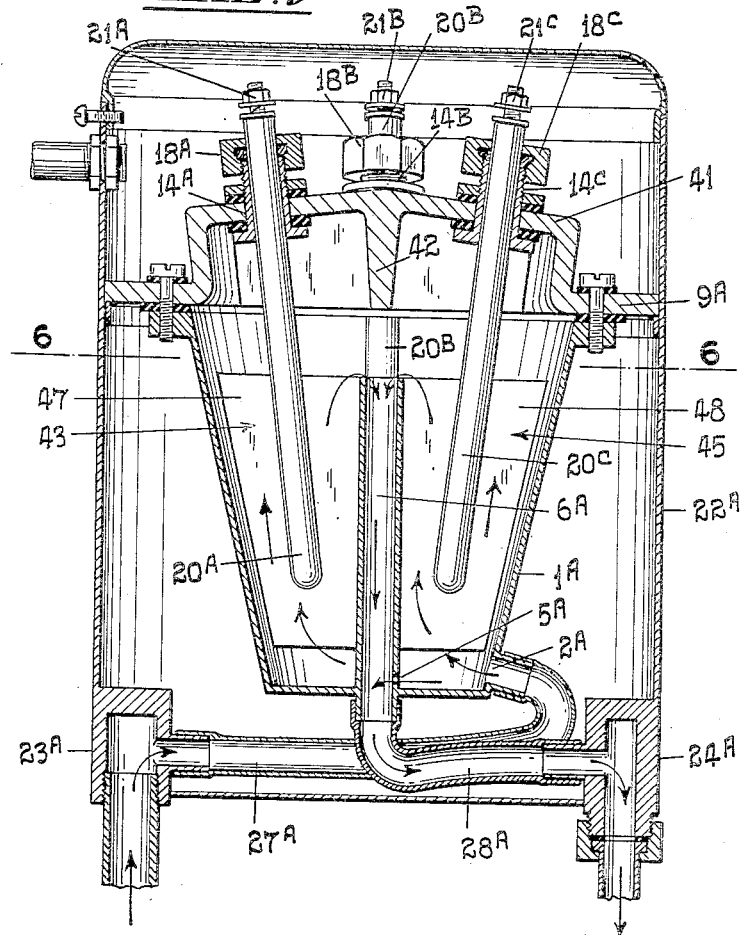
Fig. 5 shows a further modification embodying three rods as for use on three phase alternating current, the view being a diagrammatic section.

The arrows in Figs. 2 and 5 indicate the direction of flow of the water.

Figure 1:
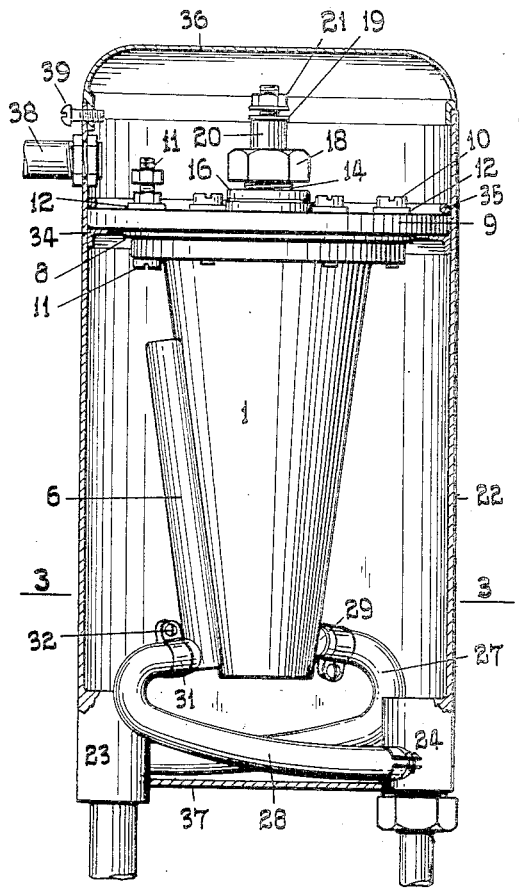
Fig. 1 is a view of a water heater constructed according to this invention showing the container in section, the heater being adapted for use on single phase alternating current.
Figure 3:
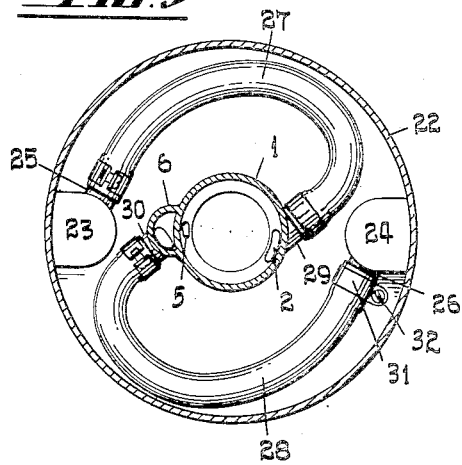
Fig. 3 is a section as on line 3—3 of Fig. 1.

Referring to Figs. 1 to 3 which illustrate the construction adapted for use on single phase alternating current, I designates a vertical hollow tapered metal cylinder adapted to contain water and provided with an inlet 2, and with two outlets 4 and 5 both feeding into a common pipe 6 integral with the cylinder 1.

Fitted to the top of the cylinder 1 is a resilient packing ring 8 and the cylinder and ring are fitted to an insulating platform 9 made of porcelain or similar insulating material. That part of the insulating platform which is inside the top of the cylinder is designed to provide a long insulating path between the rod and the cylinder. The cylinder 1 is clamped tight against the insulating platform 9, (the packing ring 8 being interposed) by means of screws 10 and 11. Resilient washers 12 are used. The clamping screw 11 is made longer than the screws 10 and this is pushed through in the reverse direction and serves as a terminal to connect one electrical lead to the cylinder.

Mounted in the insulating platform 9 concentrically with the cylinder 1 is a metal bush 14 having suitable resilient packing washers 15 on either side of the insulating platform 9. The bush 14 is clamped tight by means of a nut 16. At the top end of the bush 14 there is a packing ring 17 which is clamped down by the nut 18 making a water-tight gland about an electrode rod 20. The rod 20 is adjustable up or down through this gland, the function of this adjustment being to vary the depth of the rod 12 in the water and consequently the amount of electric current passing through the water in the cylinder. The rod has its top threaded and provided with a shoulder 19 and nut 21 forming a terminal for the connection of the other electrical lead thereto.

Securely fixed to the container 22 are two waterpipe sockets 23 and 24 having nipples 25 and 26 respectively projecting from their sides and fitted on to these nipples are rubber tubes 27 and 28 which connect with nipples 29 and 30 projecting one from the cylinder 1 and the other from the pipe 6. These rubber tubes 27 and 28 may, if necessary, be secured to the nipples by a suitable clamping arrangement such as a clip 31 which when compressed by means of a screw 32 ensures a water-tight joint being made.

The edge of the insulating platform 9 is supported at the sides of the container 22 by means of brackets 34 and is held in position by means of a split spring ring 35. A removable top 36 and a bottom 37 are fitted to the container 22 and also near to the top of this container provision is made for securing a conduit 38 which carries the electric power supply leads. An earthing screw 39 is provided.

Figure 4:
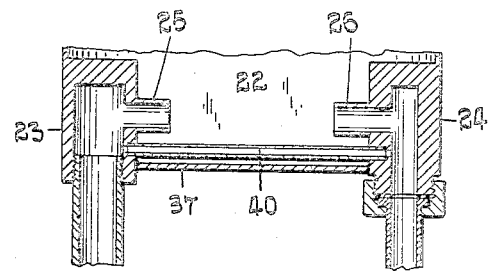
Fig. 4 shows the modification which allows the rubber tubes to drain.

If it is desired to keep the inlet rubber tube 27 drained a small pipe 40 as shown in Fig. 4 is provided. The pipe interconnects the sockets 23 and 24 to allow the water to drain.

The action of the water heater is as follows: Cold water from the main supply is admitted to the socket 23 through a suitable water pipe, the flow being controlled by means of an ordinary stop cock. The water then passes through the nipple 25 into and through the rubber tube 27, through the nipple 29 and into the bottom of the cylinder 1, some of the water passing through the outlet 5 but most of it rising up in the cylinder 1. Immediately the water touches the bottom of the rod 20 (forming the one electrode) current begins to pass from this rod through the water to the cylinder 1 (forming the other electrode) and the current in so doing causes the water to heat up—this action continues and when the water has reached the level of the outlet 4 in the cylinder the water then flows down the pipe 6, and then passes through the nipple 30, the rubber tube 28 and the outlet socket 24 from whence it is carried to the required position by a suitable pipe. When sufficient hot water has been obtained for the requirements the cold water stop cock is turned off and the action is then as follows: Water ceases to flow into the cylinder 1 and the height of the water in the cylinder immediately starts to fall because it is being drained out through the outlet 5, the water passing thence out through the nipple 30, the rubber tube 28 and the socket 24. As the level of the water falls below the bottom of the rod 20 the electrical circuit is broken and current ceases to pass from the rod to the cylinder.

The taper on the cylinder 1A is for the purpose of giving uniform resistance to the electrical flow, the distance between the electrode rod and the cylinder varying in accordance with the difference in temperature at the various levels in the cylinder, the cooler water near the bottom of same having a greater resistance than the hotter water at the top, consequently the distance is made less at the bottom than at the top.

Figure 6:
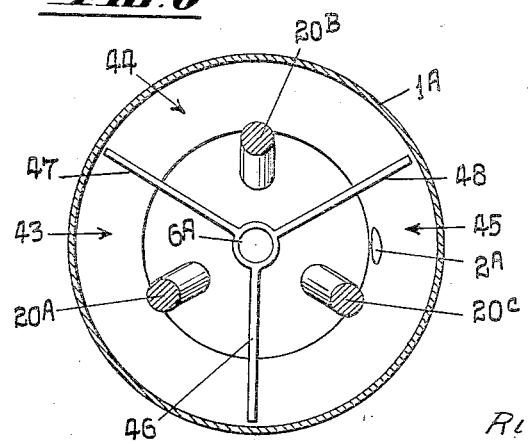
Fig. 6 is a section of the metal cylinder and rods taken as on line 6—6 of Fig. 5.

In the modification shown in Figs. 5 and 6, which is for use on three phase current, three rods 20A, 20B and 20C are used. The rods project through and are carried by an upwardly projecting portion 41 of an insulating platform 9A carried by a cylindrical casing 22A, the rods 20A, 20B and 20C being adjustable through glands comprising bushings 14A, 14B and 14C respectively, the bushings having packing rings and having nuts 18A, 18B and 18C respectively. Downwardly projecting webs 42 on the insulating platform give a long insulating path between the electrodes. The electrodes have terminal nuts 21A, 21B and 21C respectively by means of which the three electrical leads are connected to the rods, the cylinder 1A in this case not being connected with the electrical supply.

The cylinder 1A is subdivided into three compartments 43, 44 and 45 by walls 46, 47 and 48 but the compartments have their tops and bottoms open, one rod projecting into each compartment as shown more particularly in Fig. 6. The pipe 6A projects up within the cylinder 1A, the water overflowing into its open top. The perforation 5A in the pipe allows the cylinder to drain. The rubber tube 27A connects the water pipe socket 23A with an inlet 2A on the cylinder 1A, and the rubber tube 28A connects the pipe 6A with the water pipe socket 24A.

The action of this modified heater is similar to that described with reference to Figs. 1 to 3 excepting that the electrical and heating action is triplicated, the water flowing into the bottom of the container 1A and thence up the three compartments 43, 44 and 45, being heated by the flow of electricity therethrough between the electrode 20A, 20B and 20C. The water passes from the cylinder 1A through the pipe 6A. The cylinder 1A drains through the outlet 5A.

What I claim is:

1. An instantaneous electrical water heater comprising; a metal cylinder positioned with its axis vertical, a metal rod positioned within the cylinder, an insulating platform to support the cylinder and the rod, an inlet to the cylinder near the bottom and outlets to the cylinder one a small outlet near the bottom and the other a larger outlet near the top, a container surrounding the cylinder and supporting the platform and having two water-pipe sockets, and rubber tubes one connecting the one water-pipe socket with the inlet to the cylinder and the other connecting the outlets from the cylinder with the other water-pipe socket.

2. An instantaneous electrical water heater according to claim 1 characterized in that the metal cylinder is wider at the top than at the bottom.

3. An instantaneous electrical water heater according to claim 1 characterized in that the rod is adjustable axially through a gland supported by the insulating platform.

4. An instantaneous electrical water heater according to claim 1 characterized in that the portion of the insulating platform within the cylinder is shaped to provide a long insulating path between the rod and the cylinder.

5. An instantaneous electrical water heater according to claim 1 characterized by additional rods supported independently by the platform.

6. An instantaneous electrical water heater according to claim 1 characterized by additional rods supported independently by the platform and by division walls in the container to form a separate compartment in the container for each rod.

7. An instantaneous electrical water heater according to claim 1 characterized by a small pipe interconnecting the two water-pipe sockets.

8. An instantaneous electrical water heater comprising: a tapered metal cylinder wider at the top than at the bottom and arranged with its axis vertical, a metal rod axially positioned within the cylinder, an insulating platform to support the cylinder and the rod the top of the cylinder being closed by the platform and sealed by an interposed resilient packing ring but the top of the rod projecting through the platform, a terminal upon the cylinder and a terminal upon the rod, an inlet to the bottom of the cylinder, a small outlet near the bottom of the cylinder and a larger outlet near the top of the cylinder both opening into a common pipe, a container surrounding the cylinder and supporting the platform, sockets upon the container one adapted to function as a water inlet to the heater and the other as a water outlet therefrom, and rubber tubes one connecting the inlet socket with the inlet to the cylinder and the other connecting the pipe from the outlets in the cylinder with the outlet socket.

9. An instantaneous electrical water heater comprising: a tapered metal cylinder wider at the top than at the bottom and arranged with its axis vertical, a plurality of metal rods positioned within the cylinder each forming an electrode, an insulating platform to support the cylinder and the rods the top of the cylinder being closed by the platform and sealed by an interposed resilient packing ring but the tops of the rods projecting through the platform, a terminal upon each of the rods, an inlet to the bottom of the cylinder, a pipe projecting upward through the floor of the cylinder having its top open and having a small perforation immediately above the floor of the cylinder, dividing walls in the cylinder between the electrode rods, a container surrounding the cylinder and supporting the platform, sockets upon the container one adapted to function as a water inlet to the heater and the other as a water outlet therefrom, and rubber tubes one connecting the inlet socket with the inlet to the cylinder and the other connecting the pipe from the cylinder with the outlet socket.

RICHARD HOLT.